United States Patent [19]
Mueller

[11] Patent Number: 5,649,986
[45] Date of Patent: Jul. 22, 1997

[54] FILTER FOR FILTERING THE INTAKE AIR OF AN INTERNAL COMBUSTION ENGINE

[75] Inventor: Heinz Mueller, Remseck, Germany

[73] Assignee: Filtewerk Mann & Hummel GmbH, Ludwigsburg, Germany

[21] Appl. No.: 547,922

[22] Filed: Oct. 25, 1995

[30] Foreign Application Priority Data

Oct. 28, 1994 [DE] Germany ............... 44 38 556.0

[51] Int. Cl.$^6$ .................................................. B01D 46/10
[52] U.S. Cl. ................. 55/276; 55/385.3; 123/198 E
[58] Field of Search ................... 55/276, 385.3, 55/501, 497, 494, 495, 503; 123/198 E

[56] References Cited

U.S. PATENT DOCUMENTS

| | | | |
|---|---|---|---|
| 2,888,093 | 5/1959 | Wahlborg et al. | 55/276 |
| 4,130,405 | 12/1978 | Akado et al. | 55/503 |
| 4,133,661 | 1/1979 | Strnad | 55/501 |
| 4,414,170 | 11/1983 | Sano | 264/242 |
| 4,425,145 | 1/1984 | Reese | 55/385.3 |
| 4,929,263 | 5/1990 | Kasugai | 55/502 |
| 5,120,334 | 6/1992 | Cooper | 55/385.3 |
| 5,133,316 | 7/1992 | Kasai et al. | 123/198 E |

FOREIGN PATENT DOCUMENTS

| | | | |
|---|---|---|---|
| 1251396 | 12/1990 | France. | |
| 3333621 | 4/1985 | Germany | 123/198 E |
| 3707617 | 9/1988 | Germany | 123/198 E |
| 4216816 | 11/1993 | Germany. | |
| 60-45770 | 3/1985 | Japan | 123/198 E |
| 222327 | 10/1924 | United Kingdom | 55/276 |

OTHER PUBLICATIONS

Abstract of Published European Patent Application No. EP 524,333, Jan. 1993.
Kinami, Abstract of Published Japanese Patent Application No. JP 61–61958, dated Mar. 29, 1986.
Funahashi, Abstract of Published Japanese Patent Application No. JP 60–53658, dated Mar. 27, 1985.
Nakajima, Abstract of Published Japanese Patent Application No. JP 60–26157, dated Feb. 9, 1985.

*Primary Examiner*—Robert Davis
*Attorney, Agent, or Firm*—Evenson, McKeown, Edwards & Lenahan P.L.L.C.

[57] ABSTRACT

A filter, especially for filtering the air intake of an internal combustion engine, which includes an unfiltered air inlet 11, a housing 13, 14, a filter insert 15 disposed within the housing, and a clean air outlet 12. The housing part 13 surrounding the raw air area has a grid foundation structure 19 which is enveloped in a sound-damping material.

14 Claims, 1 Drawing Sheet

FILTER FOR FILTERING THE INTAKE AIR OF AN INTERNAL COMBUSTION ENGINE

BACKGROUND OF THE INVENTION

The invention relates to a filter, especially for the filtration of the air intake of an internal combustion engine, consisting of an unfiltered air inlet, a housing, a filter insert disposed within the housing, and a clean air outlet.

A filter of this kind is disclosed, for example, in U.S. Pat. No. 4,929,263. In this filter a special housing is provided. This housing comprises a supporting body. The filter insert is contained in this supporting body. The supporting body is jacketed with the housing by the plastic blow molding process. The housing can be made with relatively thin walls. A disadvantage of this filter, however, is that it is not possible to replace the filter. At the regularly performed maintenance intervals the entire filter including the supporting body and the housing have to be replaced. Thus very high disposal costs are incurred and large quantities of unsorted waste is produced.

Published European Patent Application No. EP 524,333 discloses a method for producing a cast hollow body. This hollow body, which is also usable as a filter housing, is made by means of a hollow-forming core of nonmetallic material. The hollow-forming core is a thin-walled but already shaped core which can be stabilized against external casting pressure by an internal gas pressure. It is either lost or it can be removed from the cast hollow body after it has hardened, by melting or dissolving it out. This method enables complex cast hollow bodies to be produced, especially those designed for industrial use, such as bodies through which a gas is to flow. The method, however, is relatively complicated and thus it is not economical for filter housings such as those needed for the filtration of air aspirated into internal combustion engines.

Another disadvantage of the known systems or methods is that consideration is not given to various secondary factors, such as the noise emission properties of the filter housing, as well as the reduction of the orifice noise produced by the induction of the unfiltered air.

SUMMARY OF THE INVENTION

It is an object of the invention to provide a filter which will be inexpensive to manufacture.

Another object of the invention is to provide a filter which will contribute to a considerable reduction of the induction noise of an internal combustion engine.

These and other objects are achieved in accordance with the present invention by providing a filter for filtering the intake air for an internal combustion engine, the filter comprising a housing, an unfiltered air inlet leading into an unfiltered air chamber in the housing, a filter insert disposed within the housing between the unfiltered air chamber and a filtered air chamber in the housing, and a filtered air outlet opening from the filtered air chamber of the housing, in which at least a part of the housing encompassing the unfiltered air chamber comprises a grid foundation structure enveloped in a sound-damping material.

The core idea of the invention lies in the creation of a stiff grid foundation structure which defines the shape of the filter housing. This grid foundation structure is supplemented by a shell which forms the housing, and which has sound-damping properties. For example, this shell may be made from a sound-damping material such as polypropylene or tetrapolyethylene (TPE), e.g., Santoprene.

In one embodiment of the invention, provision is made for making also the induction tube located at the air induction inlet of a sound-damping material. A tube of this kind is also known by the term, "noise losing tube," and comprises, for example, a spiral wire enveloped in a sound-absorbing material.

In accordance with a preferred embodiment of the invention, the inside of the sound-damping material has a rough surface which at the same time is porous.

Advantageously, the outer surface of the damping material can be smooth and/or poreless. If this housing construction is used on the unfiltered or raw air side of the air filter, a certain permeability to air in this material is not a disadvantage.

In another advantageous embodiment of the invention, the housing is made by a 2K plastic injection molding process. This means that, in a single plastic injection molding die, first the grid foundation structure of the housing part is formed, and then, by opening cavities, space is created for the sound-damping material and this sound-damping material is applied to this grid foundation structure in the second injection molding procedure. After the plastic material hardens, the complete part can be removed from the mold. The 2K plastic molding process is described in detail, inter alia, in U.S. Pat. No. 4,414,170, the entire disclosure of which is incorporated herein by reference.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments depicted in the accompanying drawings in which.

DETAILED DESCRIPTION OF PREFERRED EMBODIMENTS

Figure 1:
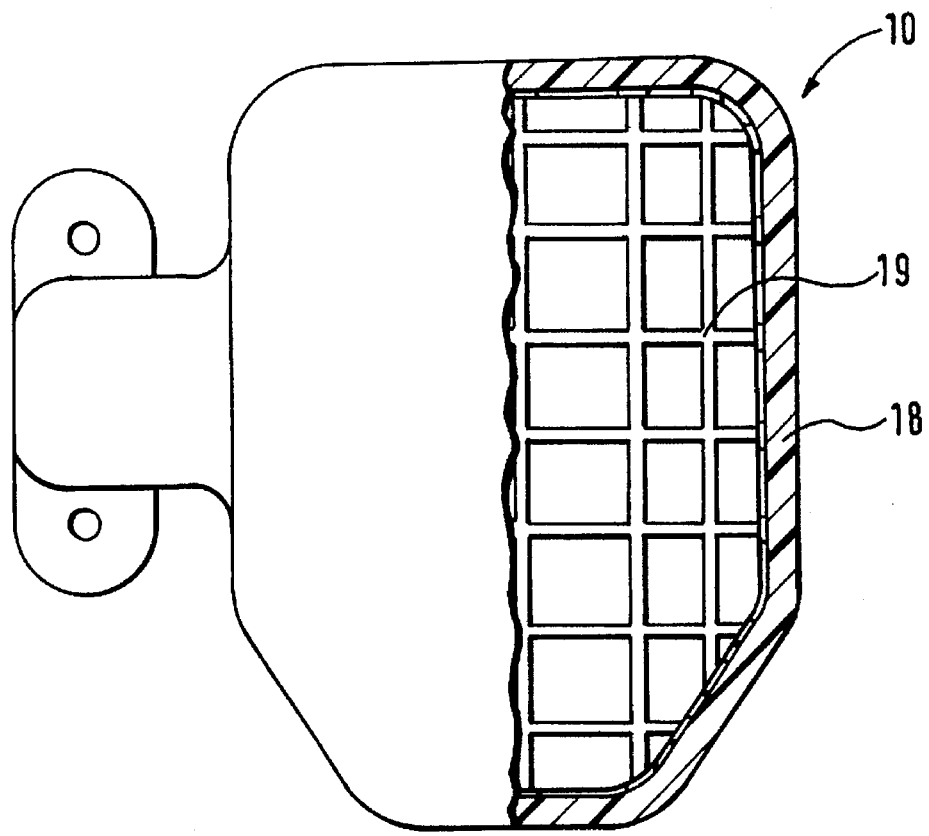
FIG. 1 shows a top plan view of the housing on the unfiltered air side of a filter.
Figure 2:
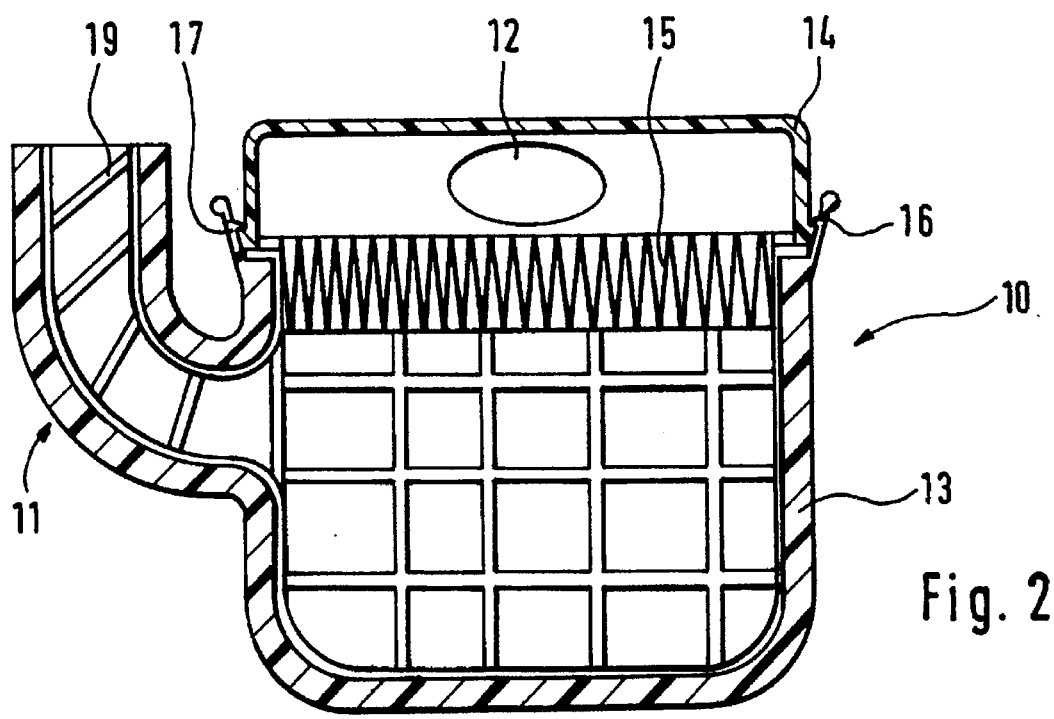
FIG. 2 shows a sectional view taken through the housing of the filter.

FIGS. 1 and 2 show an air guarding housing in the form of an injection molded hollow body for an air induction system of an internal combustion engine having a laterally projecting connecting elbow 11 for carrying the unfiltered, raw air and a discharge opening 12 for the filtered, clean air. The housing comprises a lower housing part 13 and an upper housing part 14. A filter element 15 is inserted between the two housing parts 13 and 14. These two housing parts are joined together by clips or snap connectors 16 and 17. The housing part 13 comprises a grid base structure 19 which is made in a skeleton-like manner, i.e., in the form of a lattice. On this grid base structure 19 a damping material such as Santoprene, for example, is disposed as an external form 18. The connecting elbow 11 also can be constructed with a grid foundation structure 19, as shown here, and can likewise be covered with a sound-damping material. Suitable manufacturing processes include either the 2K plastic injection molding process or a plastic blowing process in which the covering 18 is initially produced in the form of a tube and subsequently is applied to the grid foundation structure by the plastic blowing process. Inside the housing, the sound-damping material has a rough surface which at the same time is porous. Noise is absorbed by the slightly porous walls, and thus the intake noise is reduced at the inlet for the unfiltered air.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A filter for filtering the intake air for an internal combustion engine, said filter comprising a housing, an unfiltered air inlet leading into an unfiltered air chamber in said housing, a filter insert disposed within the housing between the unfiltered air chamber and a filtered air chamber in said housing, and a filtered air outlet opening from the filtered air chamber of said housing, wherein at least a part of said housing encompassing the unfiltered air chamber comprises a grid foundation structure including a plurality of ribs in the form of a lattice, said ribs defining spaces therebetween which are open to said unfiltered air chamber, said grid foundation structure being enveloped on an external side in a sound-damping material.

2. A filter according to claim 1, further comprising an air intake tube communicating with said air inlet, said air intake tube being formed of a sound-damping material.

3. A filter according to claim 1, wherein the sound-damping material has a rough, porous surface texture facing interiorly of said housing.

4. A filter according to claim 1, wherein said housing is made by the 2K plastic injection molding process.

5. A filter according to claim 1, wherein the sound-damping material has a smooth, pore-free surface facing exteriorly of said housing.

6. A filter according to claim 1, wherein said housing comprises two separable parts joined by snap fasteners, one of said parts defining the unfiltered air chamber, and the other of said parts defining the filtered air chamber, and said filter insert is clamped between the two parts when the parts are joined to each other.

7. A filter according to claim 1, wherein said ribs define portions of said sound-damping material which correspond to respective of said spaces, said portions being exposed to said unfiltered air chamber via said respective openings.

8. A filter for filtering the intake air for an internal combustion engine, said filter comprising a housing, an unfiltered air inlet leading into an unfiltered air chamber in said housing, a filter insert disposed within the housing between the unfiltered air chamber and a filtered air chamber in said housing, and a filtered air outlet opening from the filtered air chamber of said housing, wherein at least a part of said housing encompassing the unfiltered air chamber comprises a grid foundation structure including a plurality of ribs in the form of a lattice, said ribs defining spaces therebetween, said grid foundation structure being enveloped in a sound-damping material such that said sound-damping material is exposed to said unfiltered air chamber.

9. A filter according to claim 8, further comprising an air intake tube communicating with said air inlet, said air intake tube being formed of a sound-damping material.

10. A filter according to claim 8, wherein the sound-damping material has a rough, porous surface texture facing interiorly of said housing.

11. A filter according to claim 8, wherein said housing is made by the 2K plastic injection molding process.

12. A filter according to claim 8, wherein the sound-damping material has a smooth, pore-free surface facing exteriorly of said housing.

13. A filter according to claim 8, wherein said housing comprises two separable parts joined by snap fasteners, one of said parts defining the unfiltered air chamber, and the other of said parts defining the filtered air chamber, and said filter insert is clamped between the two parts when the parts are joined to each other.

14. A filter according to claim 8, wherein said grid foundation structure is enveloped on an external side in said sound-damping material.

* * * * *